(12) United States Patent
Tanaka

(10) Patent No.: US 6,507,339 B1
(45) Date of Patent: Jan. 14, 2003

(54) COORDINATE INPUTTING/DETECTING SYSTEM AND A CALIBRATION METHOD THEREFOR

(75) Inventor: Makoto Tanaka, Kamakura (JP)

(73) Assignee: Ricoh Company, Ltd., Tokyo (JP)

( * ) Notice: Subject to any disclaimer, the term of this patent is extended or adjusted under 35 U.S.C. 154(b) by 157 days.

(21) Appl. No.: 09/642,647

(22) Filed: Aug. 22, 2000

(30) Foreign Application Priority Data

Sep. 23, 1999 (JP) ........................................... 11-234990

(51) Int. Cl.$^7$ ................................................ G09G 5/00
(52) U.S. Cl. ...................................... 345/178; 345/175
(58) Field of Search ................................ 345/173, 175, 345/178; 178/18.01, 18.02, 18.03, 18.09; 702/85, 94, 95

(56) References Cited

U.S. PATENT DOCUMENTS

| | | | | |
|---|---|---|---|---|
| 4,553,842 A | * | 11/1985 | Griffin ........................ | 345/175 |
| 4,710,758 A | * | 12/1987 | Mussler et al. .............. | 345/175 |
| 4,737,773 A | * | 4/1988 | Kobayashi ................... | 345/178 |
| 4,903,012 A | * | 2/1990 | Ohuchi ........................ | 345/178 |
| 5,751,276 A | * | 5/1998 | Shih ............................ | 345/178 |
| 5,777,898 A | * | 7/1998 | Teterwak ..................... | 702/95 |
| 5,956,020 A | * | 9/1999 | D'Amico et al. ........... | 345/173 |
| 6,229,529 B1 | * | 5/2001 | Yano et al. .................. | 345/175 |
| 6,262,718 B1 | * | 7/2001 | Findlay et al. .............. | 345/178 |
| 6,292,171 B1 | * | 9/2001 | Fu et al. ...................... | 345/156 |
| 6,337,681 B1 | * | 1/2002 | Martin ........................ | 345/178 |
| 6,353,434 B1 | * | 3/2002 | Akebi et al. ................. | 345/173 |

* cited by examiner

Primary Examiner—Steven Saras
Assistant Examiner—Paul A. Bell
(74) Attorney, Agent, or Firm—Oblon, Spivak, McClelland, Maier & Neustadt, P.C.

(57) ABSTRACT

A coordinate inputting/detecting system includes a display apparatus having a display surface, a coordinate inputting/detecting apparatus having a coordinate inputting/detecting surface arranged at the display surface of the display apparatus so as to detect a designated position in the display surface of the display apparatus, a marking that is provided on the display surface of the display apparatus so as to define a predetermined virtual display area of the display apparatus, a marking coordinate determining device that determines a coordinate of the marking based on the detected designated position of the marker by the coordinate inputting/detecting apparatus when the marking is designated via the coordinate inputting/detecting surface of the coordinate inputting/detecting apparatus, a marking coordinate memorizing device that memorizes the marking coordinate determined by the marking coordinate determining device, and an adjusting device that adjusts a display area of the display apparatus to the virtual display area defined by the marking.

15 Claims, 4 Drawing Sheets

COORDINATE INPUTTING/DETECTING SYSTEM AND A CALIBRATION METHOD THEREFOR

CROSS-REFERENCE TO RELATED APPLICATIONS

This application claims priority UNDER 35 U.S.C. §119 and contains subject matter related to Japanese Patent Application No. 11-234990 filed on Aug. 23, 1999, the entire contents of which are hereby incorporated by reference herein.

BACKGROUND OF THE INVENTION

1. Field of the Invention

The present invention relates to a coordinate inputting/detecting system including a display apparatus and a coordinate inputting/detecting apparatus, and a method of calibrating the display apparatus and the coordinate inputting/detecting apparatus of the coordinate inputting/detecting system.

2. Discussion of the Background

Electronic white boards are well known, in which information, which is manually written on a writing surface of a white writing board or a writing sheet, using a writing instrument, is read by a dedicated reading scanner and is output onto a recording sheet by a dedicated printer. Also, in recent years, a coordinate inputting/detecting system is commercially provided, in which a coordinate inputting/detecting apparatus is arranged at a writing surface of an electronic white board, and in which information, which is manually written on the writing surface of the electronic white board, is input into a computer such as a personal computer in real time (i.e., as the information is written on the writing surface). For example, a soft-board manufactured by Microfield Graphics, Inc. includes a coordinate inputting/detecting apparatus arranged on a white board, and visual data, such as characters and pictures, which are written on the white board, are input into a computer in real time. In a coordinate inputting/detecting system including the soft-board, visual data, which is input through the soft-board into a computer, is displayed on a CRT display or on a large screen using a liquid crystal projector, or output onto a recording sheet by a printer. Also, a display surface of a computer which is connected to the soft-board is projected on the soft-board by a liquid crystal projector so that the computer can be operated via the soft-board.

Also, a known coordinate inputting/detecting system includes a display apparatus for displaying characters and pictures, a coordinate inputting/detecting apparatus having a coordinate inputting surface (a touch panel surface) arranged at a front surface of the display apparatus, and a control apparatus to control a display of the display apparatus according to an input from the coordinate inputting/detecting apparatus. Such a system is used as an electronic white board with the display apparatus and the coordinate inputting/detecting apparatus serving as a display surface and a writing surface of the electronic white board, respectively.

For example, in SMART 2000 manufactured by SMART Technologies Inc., an image including characters, pictures, figures and graphics is projected on a panel using a liquid crystal projector, and information manually written on a writing surface of a coordinate inputting/detecting apparatus, that is arranged at a front surface of a projecting surface (a display surface) of the panel, is input into a computer through the coordinate inputting/detecting apparatus. The manually written information and the projected image information are merged in the computer and displayed in real time via the liquid crystal projector.

Such a coordinate inputting/detecting systems including a coordinate inputting/detecting apparatus and a display apparatus as above is widely used, and the effect of the use is well received, for example, in conferences, presentations and training, because an image which is input;using the coordinate inputting/detecting apparatus can be overlaid with an image which is displayed on a display screen of the display apparatus. The coordinate inputting/detecting system is also used for an electronic-conference system by incorporating an audio and image communicating function into the coordinate inputting/detecting system and connecting remote locations with a communication line.

Also, various types of coordinate inputting/detecting apparatuses using different inputting methods are known for use in the coordinate inputting/detecting system. For example, an optical coordinate inputting/detecting apparatus that does not include a physical detecting surface, such as a coordinate inputting surface (touch sensitive panel), is known. In such an optical coordinate inputting/detecting apparatus, a coordinate inputting area is formed by light fluxes emitted by at least two light sources, and characters and figures are input by inserting a finger or a pen into the coordinate inputting area so as to interrupt or reflect the light fluxes. The optical coordinate inputting/detecting apparatus having no physical detecting surface has an advantage in that, even if the apparatus is arranged at the display surface of a display apparatus, the visibility of a display screen of the display apparatus is not hampered. The optical coordinate inputting/detecting apparatus also has an advantage in that the apparatus can be relatively easily enlarged.

In a coordinate inputting/detecting system in which a coordinate inputting/detecting apparatus is arranged at a display surface of a display apparatus, the calibration of a coordinate inputting surface (coordinate inputting area) of the coordinate inputting/detecting apparatus and a display area at a display surface of the display apparatus is important.

Generally, the calibration of a coordinate inputting surface (coordinate inputting area) of a coordinate inputting/detecting apparatus and a display area of a display apparatus is performed, for example, according to the procedure described below. In the following, as the display apparatus, a CRT display, which is generally connected to a personal computer, is used, and further, it is assumed that the calibration is performed when the coordinate inputting/detecting system is delivered to a customer's premises. In particular, calibration includes:

1) Setting various modes relating to the display apparatus (e.g., the aspect ratio, the resolution, the frequency, etc.) on an operating system (OS) of a computer.

2) Adjusting the display position, width, height and distortion of the display area at a display surface of the display apparatus according to a predetermined signal from the computer. (Generally, in a fixed type display apparatus such as a plasma display panel (PDP) and a liquid crystal display (LCD), an optimum display point is fixed to a predetermined point, and in a projecting or rear-projecting type display apparatus such as a CRT display, a front projecting type projector and a rear projecting type projector, an optimum display point is determined by a person adjusting the apparatus.)

3) Attaching the coordinate inputting/detecting apparatus to the display apparatus, and performing a positional correction using a calibration software installed in the computer. More particularly, three correcting points are displayed at upper left, upper right and lower right positions of the display area of the display apparatus, and then sequentially touched to obtain and memorize in the computer a correcting parameter (coefficient) that enables a detect position in the coordinate inputting/detecting apparatus and a display position in the display area of the display apparatus to coincide with each other. Subsequent detection of a coordinate is automatically performed according to the parameter memorized in the computer by a device driver of the coordinate inputting/detecting apparatus.

In such a coordinate inputting/detecting system including a coordinate inputting/detecting apparatus and a display apparatus as above described, however, when the system is delivered to a customer's premises, after the display area of the display apparatus is adjusted, the calibration of a coordinate inputting surface (coordinate inputting area) of the coordinate inputting/detecting apparatus and the display area of the display apparatus is performed at the customer's premises. Therefore, the work at the customer's premises is rather complicated and is time consuming.

SUMMARY OF THE INVENTION

The present invention has been made in view of the above-discussed and other problems and addresses the above-discussed and other problems.

Accordingly, preferred embodiments of the present invention provide a novel coordinate inputting/detecting system and a calibration method for the system, that can simplify the work to be performed at a customer's premises when the system is delivered to the customer's premises.

According to a preferred embodiment of the present invention, therefore, there is provided a coordinate inputting/detecting system including a display apparatus having a display surface, and a coordinate inputting/detecting apparatus having a coordinate inputting/detecting surface arranged at the display surface of the display apparatus so as to detect a designated position in the display surface of the display apparatus. The coordinate inputting/detecting system further includes a marking that is provided on the display surface of the display apparatus so as to define a predetermined virtual display area of the display apparatus, and a marking coordinate determining device that determines a coordinate of the marking with the coordinate inputting/detecting apparatus when the marking is designated via the coordinate inputting/detecting surface of the coordinate inputting/detecting apparatus. Furthermore, the coordinate inputting/detecting system includes a marking coordinate memorizing device that memorizes the marking coordinate determined by the marking coordinate detecting device, and an adjusting device that adjusts a display area of the display apparatus to the virtual display area defined by the marking.

Accordingly, in the above coordinate inputting/detecting system, the display apparatus and the coordinate inputting/detecting apparatus are calibrated by designating the portion of marking defining the predetermined virtual display area of the display apparatus and by memorizing the coordinate of the marking, and thereafter, the display area of the display apparatus is adjusted to the virtual display area defined by the marking. Therefore, the calibration of the display apparatus and the coordinate inputting/detecting apparatus can be performed before the shipment of the coordinate inputting/detecting system from a factory, and thereby, when the system is delivered to a customer's premises, only the adjustment of the display area of the display apparatus to the virtual display area is performed. Thus, the work to be performed when the system is delivered to the customer's premises is simplified, and accordingly, can be performed quickly and reliably.

According to the invention, in the above coordinate inputting/detecting system, the display apparatus may not be required to be driven when the coordinate of the marking is detected. Therefore, the calibration of the display apparatus and the coordinate inputting/detecting apparatus before shipment is facilitated.

Further, in the above coordinate inputting/detecting system, the coordinate inputting/detecting surface of the coordinate inputting/detecting apparatus may include a source of light flux and the marking may include a marking member that interrupts or reflects the light flux. By thus configuring the system, the marking coordinate is detected without an operation of designating the marking by a designating member, for example, by a finger, further facilitating the calibration of the display apparatus and the coordinate inputting/detecting apparatus before the shipment.

According to another preferred embodiment of the present invention, a coordinate inputting/detecting system includes a display apparatus having a display surface, and a coordinate inputting/detecting apparatus having a coordinate inputting/detecting surface, that includes a source of light flux, arranged at the display surface of the display apparatus so as to detect a designated position in the display surface of the display apparatus. The coordinate inputting/detecting system further includes a marking member that is arranged on the display surface of the display apparatus according to a display area of the display apparatus so as to interrupt or reflect the light flux, a marking coordinate determining device that is configured to detect the coordinate where the marking member is arranged based on the detected designated position of the making member, and a marking coordinate memorizing device that memorizes the coordinate of the marking member detected by the marking coordinate determining device.

Accordingly, in the coordinate inputting/detecting system configured as immediately above, the calibration of the display apparatus and the coordinate inputting/detecting apparatus is performed by arranging the marking member on the display surface of the display apparatus according to the display area of the display apparatus and by detecting and memorizing the coordinate of the marking member as a result of the light flux being interrupted or reflected by the marking member. Therefore, the calibration of the display apparatus and the coordinate inputting/detecting apparatus can be completed, while the display area of the display apparatus is defined and fixed, before the shipment of the system. Thus, the operation of adjusting the display area of the display apparatus when the system is delivered to a customer's place is eliminated, further facilitating the work to be done at a customer's premises when the system is delivered to the customer's premises.

BRIEF DESCRIPTION OF THE DRAWINGS

A more complete appreciation of the present invention and many of the attendant advantages thereof will be readily obtained as the same becomes better understood by reference to the following detailed description when considered in conjunction with accompanying drawings, wherein.

DETAILED DESCRIPTION OF THE PREFERRED EMBODIMENTS

Figure 1:
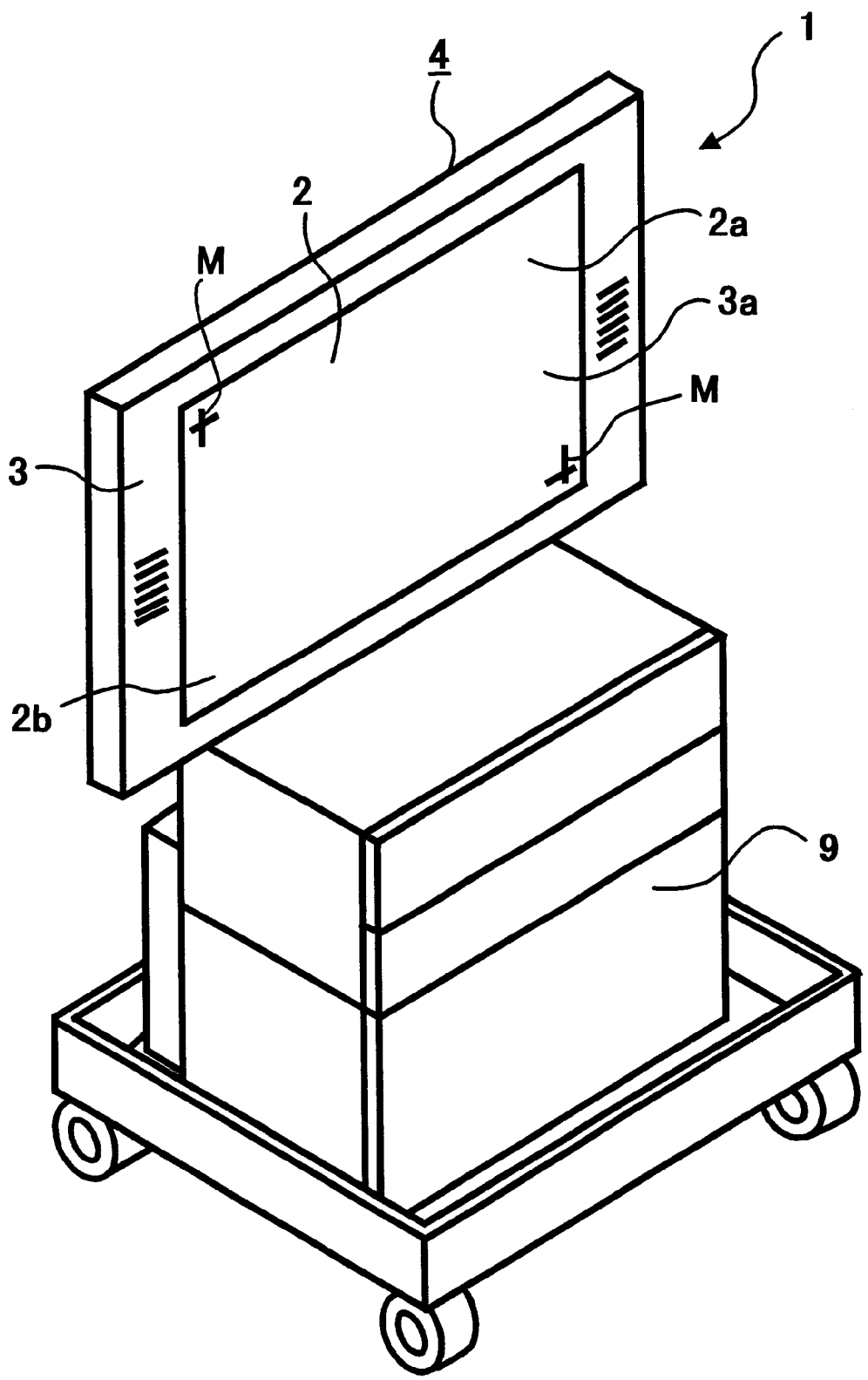
FIG. 1 is a perspective view illustrating an appearance of a coordinate inputting/detecting system according to a preferred embodiment of the present invention.

Referring now to the drawings, wherein like reference numerals designate identical or corresponding parts throughout the several views, preferred embodiments of the present invention are described.

Figure 3:
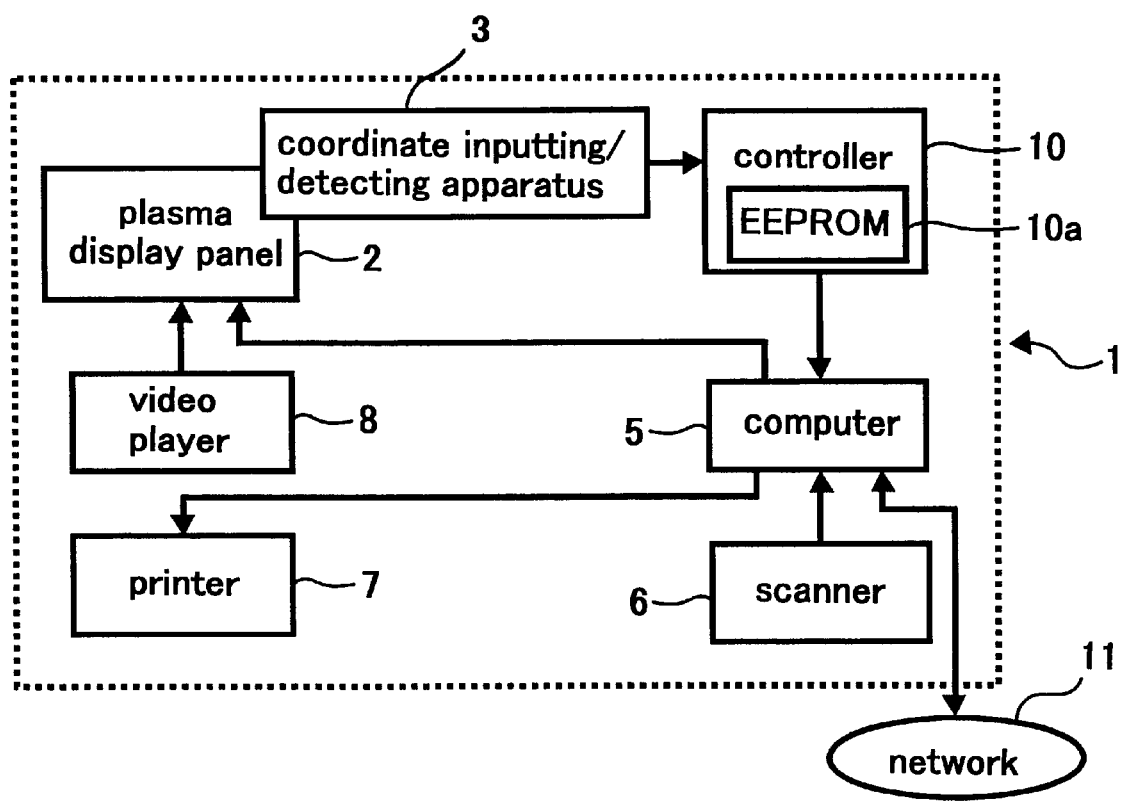
FIG. 3 is a block diagram explaining the electrical connection of each part of the coordinate inputting/detecting system.

FIG. 1 is a perspective view illustrating an appearance of a coordinate inputting/detecting system 1 according to a preferred embodiment of the present invention. As illustrated in FIG. 1, the coordinate inputting/detecting system 1 includes a panel 4 and a box 9. The panel 4 includes a plasma display panel (PDP) 2 serving as a display apparatus and a coordinate inputting/detecting apparatus 3. The box 9 includes therein, as illustrated in FIG. 3, a computer 5, a scanner 6 that reads an image of an original document, a printer 7 that outputs image data onto a recording sheet and a video player 8. The coordinate inputting/detecting apparatus 3 includes a coordinate inputting/detecting area 3a serving as a coordinate inputting/detecting surface, which is formed by light fluxes emitted radially or fanwise from at least two or more light sources (not shown). When a designating member (not shown), such as a finger or a pen, is inserted in the coordinate inputting/detecting area 3a, the designating member interrupts the light fluxes in the coordinate inputting/detecting area 3a, thereby the position designated by the designating member is detected by a triangulation based upon a light receiving position in a light receiving element (not shown), such as a charge coupled device (CCD), and thus characters, pictures, figures and so forth are input.

The plasma display panel 2 and the coordinate inputting/detecting apparatus 3 are integrated with each other such that the coordinate inputting/detecting apparatus 3 is located at the side of the display surface 2a of the plasma display panel 2. Further, the coordinate inputting/detecting apparatus 3 is accommodated in the panel 4 such that the coordinate inputting/detecting area 3a of the coordinate inputting/detecting apparatus 3 is located at the display surface 2a of the plasma display panel 2. Thus, the panel 4 accommodates the plasma display panel 2 and the coordinate inputting/detecting apparatus 3 such that the display surface and the writing surface of the coordinate inputting/detecting system 1 are formed by the display surface 2a of the plasma display panel 2 and the coordinate inputting/detecting area 3a of the coordinate inputting/detecting apparatus 3, respectively.

Figure 2:
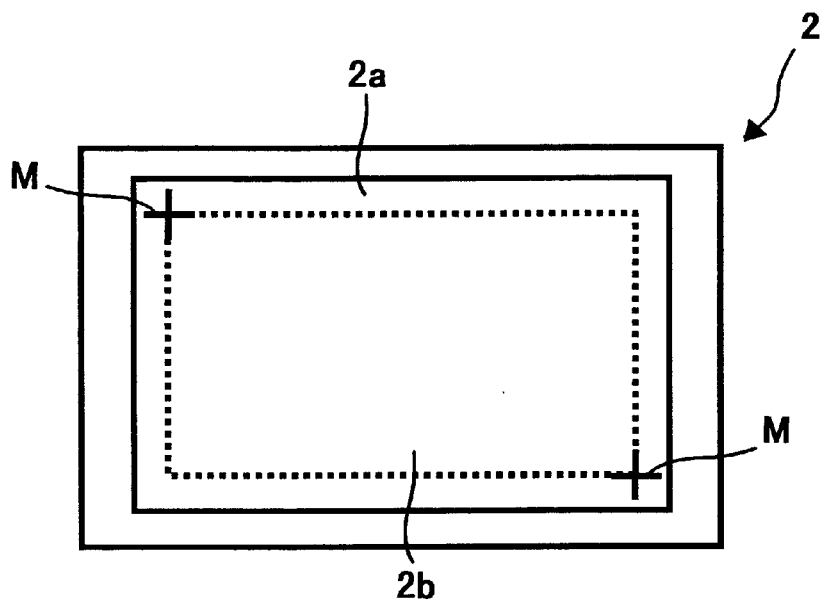
FIG. 2 is a front view of a plasma display panel of the coordinate inputting/detecting system.

Next, the plasma display panel 2 is described. In the embodiment, the plasma display panel 2 having a large display surface, such as the one of 40 or 50 inch size, is used so that the plasma display panel 2 is suitable for use as an electronic white board. FIG. 2 is a front view of the plasma display panel 2. As illustrated in FIG. 2, a pair of markings M is provided on the display surface 2a of the plasma display panel 2. The markings M define a predetermined virtual display area 2b of the plasma display panel 2, and are positioned at two corners of the virtual display area 2b, respectively, facing each other on a diagonal line thereof. The virtual display area 2b defines a largest display area that can be realized in the plasma display panel 2. Further, the shape of the markings M is not limited to a cross mark illustrated in FIG. 2, and the markings M can be L-shaped so as to indicate a corner, or can be formed by dots. Furthermore, although the markings M are visibly illustrated in FIG. 2 for the sake of the explanation, in actuality, the markings M are inconspicuous so as not to interfere with an image displayed in the display area 2b of the plasma display panel 2. For example, the markings M may be printed by a transparent fluorescent paint, or formed by sticking a transparent sticker or. a string member, or by putting a scratch on the display surface 2a of the plasma display panel 2. Furthermore, in this embodiment, the pair of markings M is provided for one virtual display area 2b corresponding to one aspect ratio of the plasma display panel 2, however, a plurality of the pair of markings M may be provided so as to correspond to a plurality of the display areas 2b corresponding to different aspect ratios of the plasma display panel 2.

Furthermore, the plasma display panel 2 has a video input terminal and a speaker so that a video player 8 and other information apparatuses and audio visual apparatuses, such as a laser disc player, a digital video disc (DVD) player and a video camera, can be connected so to be suitable for use as a large size display monitor. Also, the plasma display panel 2 has an adjusting device (not shown) for adjusting the display position, width, height and distortion of the plasma display panel 2.

FIG. 3 is a block diagram for explaining the electrical connection of each part of the coordinate inputting/detecting system 1. As illustrated in FIG. 3, in the coordinate inputting/detecting system 1, the plasma display panel 2, the scanner 6, the printer 7 and the video printer 8 are respectively connected to the computer 5, and the whole part of the coordinate inputting/detecting system 1 is controlled by the computer 5. A controller 10 for the coordinate inputting/detecting apparatus 3 calculates a coordinate position in the coordinate inputting area 3a, which is designated by a designating member such as a finger or a pen, and is connected to the computer 5. The coordinate inputting/detecting apparatus 3 is also connected to the computer 5 via the controller 10. Also, the coordinate inputting/detecting system 1 can be connected to a network 11 via the computer 5, and data generated by another computer connected to the network 11 can be displayed by the plasma display panel 2, or data generated by the coordinate inputting/detecting system 1 can be transferred to another computer connected to the network 11. The controller 10 includes a CPU, a ROM and a RAM (not shown). The controller 10 also includes an EEPROM 10a, which may be a non-volatile memory, for memorizing a marking coordinate described later.

Figure 4:
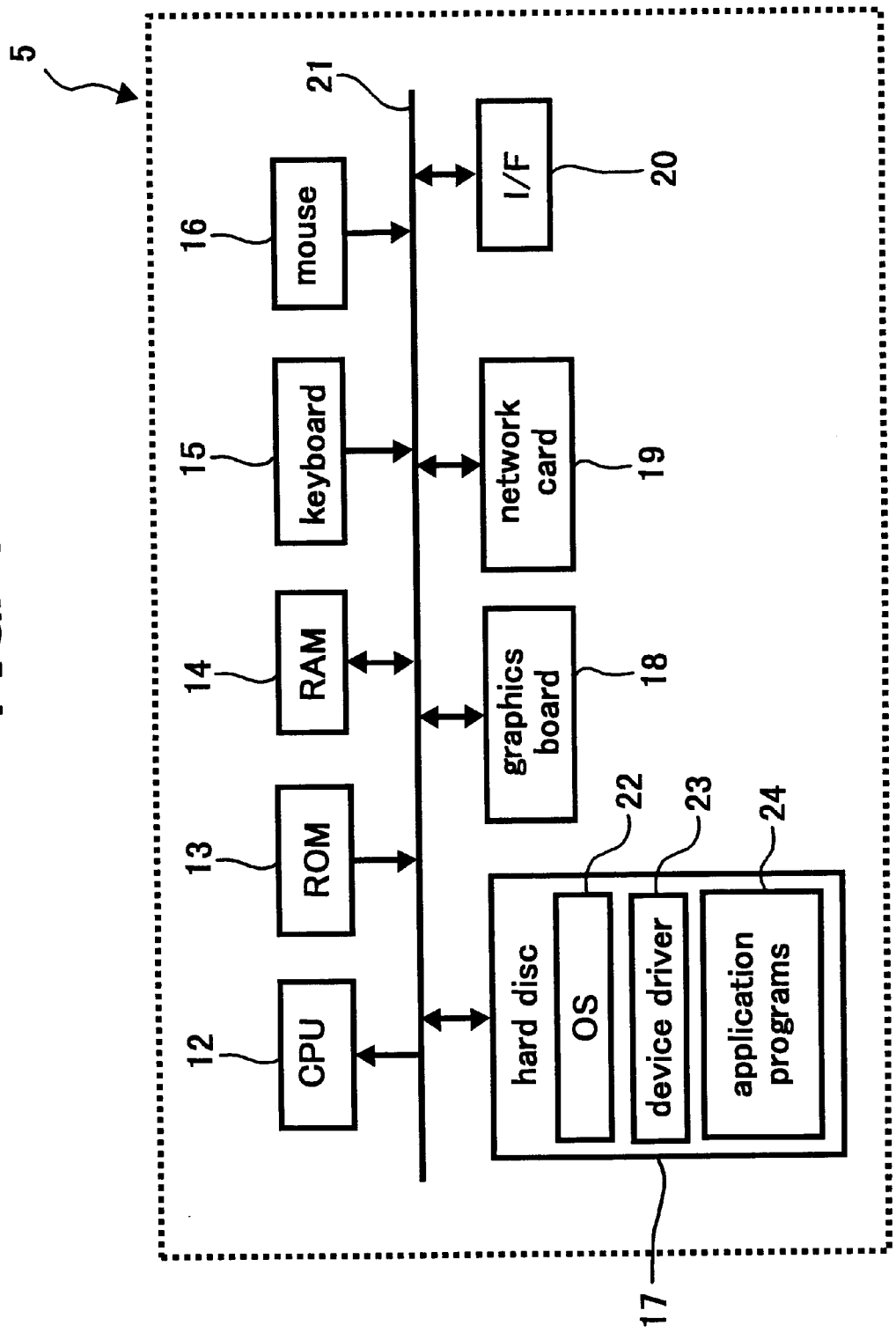
FIG. 4 is a block diagram explaining the electrical connection of each part of a computer of the coordinate inputting/detecting system.

FIG. 4 is a block diagram for explaining the electrical connection of each part of the computer 5. As illustrated in FIG. 4, the computer 5 includes a CPU 12 that controls the whole part of the coordinate inputting/detecting system 1, a ROM 13 storing a start program and other programs, a RAM 14 that is used as a work area for the CPU 12, a keyboard 15 for inputting characters, numerals and various instructions, a mouse 16 for moving a cursor and for selecting an area, a hard disc (HD) 17, a graphics board 18 that is connected to the plasma display panel 2 so as to control a display of an image in the plasma display panel 2, a network card (or a modem) 19 for connecting to the network 11, an interface (I/F) 20 for connecting the controller 10, the scanner 6 and the printer 7 to the computer 5, and a bus 21 for connecting each part of the computer 5 with each other.

In the hard disk (HD) 17, an operating system (OS) 22, a device driver 23 for operating the coordinate inputting/detecting apparatus 3 on the computer 5 via the controller 10, and various application programs 24, such as drawing, word processing, spread sheet, and presentation application programs, are stored. Further, the computer 5 is configured so that a FD drive apparatus, a CD-ROM drive apparatus and a MO drive apparatus can be also connected to the computer 5.

The applications programs 24 are executed by the CPU 12 under control of the operating system 22, which is activated when the computer 5 is turned on. For example, when the drawing application is executed by a predetermined operation of the keyboard 15 or the mouse 16, a predetermined image is displayed in the plasma display panel 2 by the drawing application via the graphics board 18. Also, the device driver 23 is activated together with the operating system 22 so as to be put in a state where data can be input from the coordinate inputting/detecting apparatus 3 via the controller 10. If the user writes or draws a character or a figure by inserting a designating member, such as a finger or a pen, in the coordinate inputting/detecting area 3a of the coordinate inputting/detecting apparatus 3 when the drawing application is being activated, the coordinate information of the designating member is input into the computer 5 as image data written or drawn by the designating member. The image data is, for example, displayed in the plasma display panel 2 as an overlaying image relative to a displayed image. In more detail, the CPU 12 of the computer 5 generates drawing information for drawing a line or a character according to the input image data, and writes the drawing information into a video memory (not shown) provided in the graphics board 18 so as to be located in a position corresponding to the input coordinate information. Then, the graphics board 18 sends the drawing information written in the video memory to the plasma display panel 2 as an image signal, such that the same character as written by the user is displayed in the plasma display panel 2. That is, the computer 5 recognizes the coordinate inputting/detecting apparatus 3 as a pointing device such as the mouse 15, and processes the information sent from the coordinate inputting/detecting apparatus 3 in the same manner as when a character is written by the drawing application using the mouse 16.

When the coordinate inputting/detecting system 1 is shipped out from a factory, for example, a calibration of the coordinate inputting/detecting apparatus 3 and the plasma display panel 2 is performed at the factory. Generally, prior to the calibration, when the coordinate inputting/detecting apparatus 3 is attached to the plasma display panel 2, the positional deviation in the attachment is corrected.

When calibrating the coordinate inputting/detecting apparatus 3 and the plasma display panel 2 after the coordinate inputting/detecting apparatus 3 is attached to the plasma display panel 2, only the coordinate inputting/detecting apparatus 3 is activated, and the plasma display panel 2 is not required to be activated. Then, the person adjusting the coordinate inputting/detecting system 1 designates, for example, by a finger, the predetermined markings M provided on the plasma display panel 2. The light fluxes in the coordinate inputting/detecting area 3a of the coordinate inputting/detecting apparatus 3 are interrupted by the finger of the adjusting person, and thereby the position of the finger, i.e., the position of the markings M, is detected. The detected position of the markings M is memorized as the marking coordinate in the EEPROM 10a, and thereby the calibration of the coordinate inputting/detecting apparatus 3 and the plasma display apparatus 2 is completed.

Accordingly, when the coordinate inputting/detecting system 1 is delivered to a customer's premises, only the following two operations are required to be performed;

1) Setting of various modes relating to the plasma display panel 2, such as the aspect ratio, the resolution and the frequency, in the operating system 22 of the computer 5

2) Adjustments of the display position, width, height and distortion of the plasma display panel 2 by adjusting the display area of the plasma display panel 2 to the markings M, i.e., the virtual display area 2b, by manipulating the adjusting device of the plasma display panel 2 in accordance with a predetermined signal from the computer 5.

That is, in the coordinate inputting/detecting system 1 according to the preferred embodiment of the present invention, the calibration of the coordinate inputting/detecting apparatus 3 is not necessary when the coordinate inputting/detecting system 1 is delivered to a customer's premises.

In the above preferred embodiment, an optical interrupting type coordinate inputting/detecting apparatus is used. However, such coordinate inputting/detecting apparatuses in which a coordinate inputting surface such as a touch sensitive panel is arranged at a front surface of a display apparatus and such optical reflection type coordinate inputting/detecting apparatuses, in which a designated position is detected by reflecting a light flux in a coordinate inputting area and by receiving the reflected light by a receiving element, can be also used.

Also, other types of display apparatuses than the plasma display panel 2, for example an LCD, can be used.

Now, another embodiment of the present invention is described with reference to FIG. 5. The same or identical parts as those of the previous embodiment are denoted by the same references, and the explanation thereof is omitted.

In this embodiment, a rod-like marking member O is detachably arranged at the display surface 2a of the plasma display panel 2. As the coordinate inputting/detecting apparatus 3, an optical interrupting or reflecting type coordinate inputting/detecting apparatus is used. The following description is made for a case where an optical interrupting type coordinate inputting/detecting apparatus is used.

Figure 5:
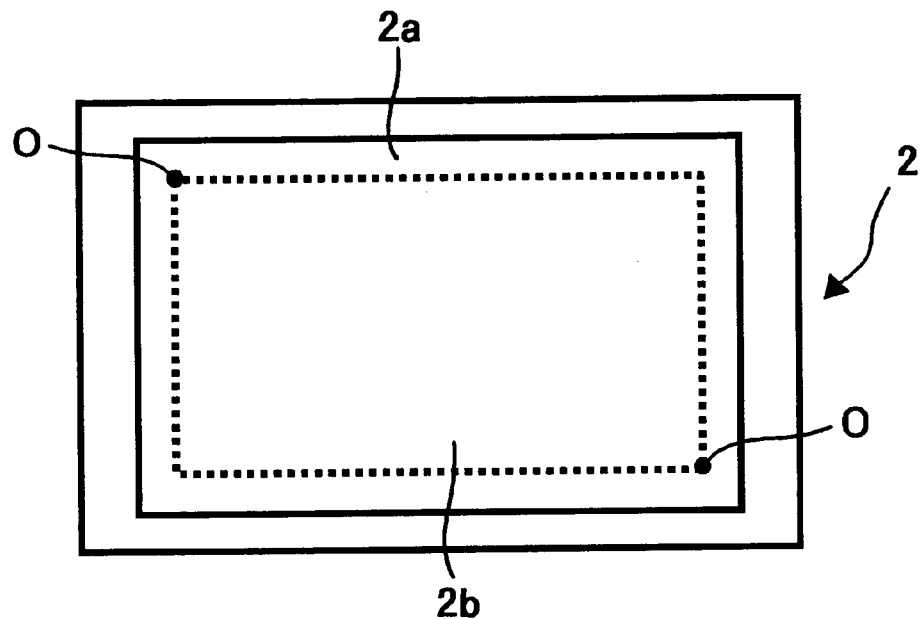
FIG. 5 is a front view of a plasma display panel of a coordinate inputting/detecting system according to another embodiment of the present invention.

FIG. 5 is a front view illustrating the plasma display panel 2. As illustrated in FIG. 5, a pair of the marking members O is detachably arranged at the display surface 2a of the plasma display panel 2. The marking members O define a predetermined virtual display area 2b in the plasma display panel 2, and the marking members O are located at two corners of the virtual display area 2b, respectively, facing each other on a diagonal line of the virtual display area 2b. The virtual display area 2b is a largest display area that can be realized in the plasma display panel 2.

In the coordinate inputting/detecting system 1 according to this embodiment also, a calibration of the coordinate inputting/detecting apparatus 3 and the plasma display panel 2 is performed at a factory before the system 1 is shipped from the factory. When the coordinate inputting/detecting apparatus 3 is attached to the plasma display panel 2, the positional deviation in the attachment is generally corrected.

When calibrating the coordinate inputting/detecting apparatus 3 and the plasma display apparatus 2 after the coordinate inputting/detecting apparatus 3 is attached to the plasma display panel 2, only the coordinate inputting/detecting apparatus 3 is activated, and the plasma display panel 2 is not required to be activated. The light fluxes in the coordinate inputting/detecting area 3a of the coordinate inputting/detecting apparatus 3 are interrupted by the marking members O, and thereby the position of the marking members O is detected. The detected position is memorized as the marking coordinate in the EEPROM 10, and thereby the calibration of the coordinate inputting/detecting apparatus 3 and the plasma display apparatus 2 is completed. Thereafter, the marking members O are removed from the display surface 2a of the plasma display panel 2.

Accordingly, when the coordinate inputting/detecting system 1 is delivered to a customer's premises, the calibration of the coordinate inputting/detecting apparatus 3 and the plasma display panel 2 is not necessary, and only the two operations as described above are performed.

In this embodiment, as described above, because the light fluxes in the coordinate inputting area 3a of the coordinate inputting/detecting apparatus 3 are interrupted by the marking members O which are detachably arranged at the display surface 2a of the plasma display panel 2, the marking coordinate that defines the virtual display area 2b can be detected without a designating operation by a person adjusting the coordinate inputting/detecting system 1.

When an optical reflecting type coordinate inputting/detecting apparatus is used, the marking members O are so configured to have a reflective surface, such that the light fluxes in the coordinate inputting area of the coordinate inputting/detecting apparatus are reflected by the marking members O so as to be detected.

In this embodiment also, other types of display apparatus than the plasma display panel 2, for example an LCD, can be used.

Now, another embodiment of the present invention is described with reference to FIG. 6. The same or identical parts as those of the previous embodiments are denoted by the same references, and the explanation thereof is omitted. In this embodiment, a projecting type display apparatus, such as a CRT display apparatus, a front projecting type projector, or a rear projecting type projector, in which the display area is substantially fixed and greatly varies depending upon the apparatus and therefore the display area is hard to be defined in advance, is used as the display apparatus. When a projecting type display apparatus is used, for example, because of a relatively large variation in the display area depending upon the apparatus, marking for defining a virtual display area, such the markings M and the marking members O in the previous embodiments, can not be provided at the display surface of display apparatus in advance. Therefore, a calibration method different from the ones in the previous embodiments is applied.

Figure 6:
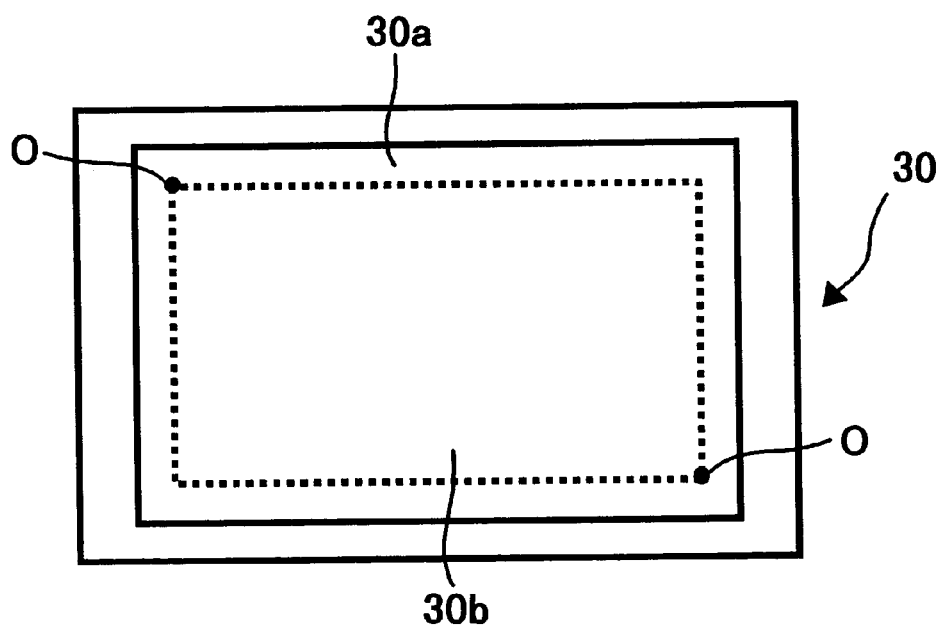
FIG. 6 is a front view of a plasma display panel of a coordinate inputting/detecting system according to another embodiment of the present invention.

FIG. 6 is a front view illustrating a rear projecting type projector 30. As illustrated in FIG. 6, when the rear projecting type display apparatus 30 is activated, a predetermined display area 30b, which is a largest display area that can be realized in the rear projecting type projector 30, is generated in the display surface 30a of the rear projecting type projector 30. Then, a pair of marking members O is detachably arranged at two corners facing each other on a diagonal line of the display area 30b. These marking members O designate the display area 30b of the rear projecting type projector 30. The marking members O may be arranged at the display surface 30a before or after the coordinate inputting/detecting apparatus 30 is attached to the rear projecting type projector 30.

After arranging the marking members O at the display surface 30a of the rear projecting type projector 30, the coordinate inputting/detecting apparatus 3 is activated. The light fluxes in the coordinate inputting area 3a of the coordinate inputting/detecting apparatus 3 are interrupted by the marking members O arranged at the display surface 3a of the rear projecting type projector 30, and thereby the position of the marking members O is detected. The detected position of the marking members O is memorized in the EEPROM 10a, and thereby the calibration of the coordinate inputting/detecting apparatus 3 and the rear projecting type projector 30 is completed. The marking members O are then removed from the display surface 30a of the rear projecting type projector 30.

Thus, when a projecting type display apparatus is used, the adjustment of a display area of the display apparatus, which needs to be performed when the coordinate inputting/detecting system according to either of the previous embodiments is delivered to a customer's promises, is not required.

When an optical reflecting type coordinate inputting/detecting apparatus is used, the marking members O are so configured to have a reflective surface, such that the light fluxes in the coordinate inputting/detecting area are reflected by the marking members O so as to be detected.

Numerous additional modifications and variations of the present invention are possible in light of the above teachings. It is therefore to be understood that within the scope of the appended claims, the present invention may be practiced otherwise than as specifically described herein.

What is claimed as new and is desired to be secured by Letter Patent of the United State is:

1. A coordinate inputting/detecting system, comprising:
   a display apparatus having a display surface;
   a coordinate inputting/detecting apparatus having a coordinate inputting/detecting surface arranged at the display surface of the display apparatus so as to detect a designated position on the display surface of the display apparatus;
   a marking that is provided on the display surface of the display apparatus so as to define a predetermined virtual display area of the display apparatus;
   a marking coordinate determining device that determines a coordinate of the marking based on detection of said designated position by the coordinate inputting/detecting apparatus when the marking is designated via the coordinate inputting/detecting surface of the coordinate inputting/detecting apparatus;
   a marking coordinate memorizing device that memorizes the marking coordinate determined by the marking coordinate determining device;
   an adjusting device that adjusts a display area of the display apparatus to the virtual display area defined by the marking; and
   wherein the display apparatus is not driven when determining the coordinates of the marking with the marking coordinate determining device.

2. The coordinate inputting/detecting system of claim 1, wherein the coordinate inputting/detecting surface of the coordinate inputting/detecting apparatus comprises a source of light flux and the marking comprises a marking member that interrupts or reflects the light flux from said source.

3. The coordinate inputting/detecting system, comprising:
- a display apparatus having a display surface;
- a coordinate inputting/detecting apparatus having a coordinate inputting/detecting surface arranged at the display surface of the display apparatus so as to detect a designated position in the display surface of the display apparatus, including a source of light flux produced at the coordinate inputting/detecting surface;
- a marking member that is arranged on the display surface of the display apparatus according to a display area of the display apparatus so as to interrupt or reflect light flux from the source;
- a marking coordinate determining device that is configured to determine a coordinate where the marking member is arranged based on the detected designated position; and
- a marking coordinate memorizing device that memorizes the coordinate of the marking member determined by the marking coordinate determining device.

4. A method of calibrating a display apparatus and a coordinate inputting/detecting apparatus of a coordinate inputting/detecting system, the display apparatus having a display surface, the coordinate inputting/detecting apparatus having a coordinate inputting/detecting surface arranged at the display surface of the display apparatus so as to detect a designated position on the display surface of the display apparatus, the method comprising the steps of:
- arranging a marking that defines a predetermined virtual display area of the display apparatus on the display surface of the display apparatus;
- driving the coordinate inputting/detecting apparatus;
- detecting a coordinate of the marking when the marking is designated via the coordinate inputting/detecting surface of the coordinate inputing/detecting apparatus;
- memorizing the detected coordinate, the detection step being performed by not driving the display apparatus; and
- adjusting a display area of the display apparatus to the virtual display area defined by the marking.

5. The method of claim 4, wherein the display apparatus is not driven during said driving step.

6. The method of claim 4, wherein the coordinate inputting/detecting surface of the coordinate inputting/detecting apparatus comprises a source of light flux and the detecting. step comprises detecting an interruption or reflection of the light flux by said marking.

7. A method of calibrating a display apparatus and a coordinate inputting/detecting apparatus of a coordinate inputting/detecting system, the display apparatus having a display surface, the coordinate inputting/detecting apparatus having a coordinate inputting/detecting surface including a source of light flux, and the coordinate inputting/detecting surface of the coordinate inputting/detecting apparatus being arranged at the surface of the display surface of the display apparatus so as to detect a designated position on the display surface of the display apparatus, the method comprising steps of:
- driving the display apparatus so as to generate a display area thereof in the display surface of the display apparatus;
- arranging a marking member to interrupt or reflect the light flux on the display surface of the display apparatus according to the display area of the display apparatus;
- driving the coordinate inputting/detecting apparatus;
- detecting a coordinate of the marking member based on interrupting or reflecting the light flux by the marking member; and
- memorizing the detected coordinate of the marking member.

8. The method of claim 7, further comprising:
- removing the marking member from the display surface of the display apparatus.

9. A coordinate inputting/detecting system, comprising:
- a display apparatus having a display surface;
- first means for detecting a designated position on the display surface of the display apparatus, including a coordinate inputting/detecting surface arranged at the display surface of the display apparatus;
- a marking that is provided on the display surface of the apparatus so as to define a predetermined virtual display area of the display apparatus;
- second means for detecting a coordinate of the marking based on the designated position detected by said first means when the marking is designated via the coordinate inputting/detecting surface of the first means;
- means for memorizing the marking coordinate detected by the second means; and
- wherein said display apparatus is not driven for detecting the coordinate of the marking.

10. The system of claim 9, further comprising:
- means for adjusting a display area of the display apparatus to the virtual display area defined by the marking.

11. A coordinate inputting/detecting system, comprising:
- a display apparatus having a display surface;
- first means for detecting a designated position on the display surface of the display apparatus, including a coordinate inputting/detecting surface arranged at the display surface of the display apparatus and including a source of light flux;
- second means for interrupting or reflecting the light flux, said second means being provided on the display surface of the display apparatus according to a display area of the display apparatus;
- third means for detecting a coordinate of a position based on interrupting or reflecting the light flux by the second means; and
- fourth means for memorizing the coordinate detected by the third means.

12. The system of claim 11, wherein said second means is removably provided on said display surface.

13. A coordinate inputting/detecting system, comprising:
- a display apparatus having a display surface;
- a coordinate inputting/detecting apparatus having a coordinate inputting/detecting surface arranged at the display surface so as to detect a designated position on the display surface;
- a marking provided on the display surface to define a predetermined virtual display area of the display apparatus;
- a marking coordinate determining device for determining marking coordinates;
- means for storing the marking coordinates;
- means for adjusting a display area of the display apparatus to the virtual display area defined by the marking; and
- wherein the display apparatus is not driven when the marking coordinates are determined.

14. A method of calibrating a display apparatus and a coordinate inputting/detecting apparatus of a coordinate inputting/detecting system, the method comprising:

providing a marking on a display surface of the display apparatus to define a predetermined virtual display area of the display apparatus;

determining marking coordinates of the marking provided on the display surface;

storing the marking coordinates in a memory;

adjusting a display area of the display apparatus to the virtual display area defined by the marking; and wherein the display apparatus is not driven when the marking coordinates are determined.

15. A coordinate inputting/detecting system, comprising:

a display apparatus having a display surface;

a coordinate inputting/detecting apparatus having a coordinate inputting/detecting surface arranged at the display surface so as to detect a designated position on the display surface, said coordinate inputting/detecting apparatus further including a source of light flux;

a marking member provided on the display surface to define a predetermined virtual display area of the display apparatus;

a marking coordinate determining device for determining marking coordinates, the marking coordinates being determined by interrupting or reflecting the light flux by the marking member;

means for storing the marking coordinates; and means for adjusting a display area of the display apparatus to the virtual display area defined by the marking.

* * * * *

UNITED STATES PATENT AND TRADEMARK OFFICE
CERTIFICATE OF CORRECTION

PATENT NO.    : 6,507,339 B1                                                  Page 1 of 1
DATED         : January 14, 2003
INVENTOR(S)   : Tanaka It is certified that error appears in the above-identified patent and that said Letters Patent is hereby corrected as shown below:

<u>Title page,</u>
Item [30], Foreign Application Priority Data is incorrect and should read:

-- [30]  Foreign Application Priority Data
  Aug. 23, 1999  (JP) ......................... 11-234990 --

Signed and Sealed this

Tenth Day of June, 2003

JAMES E. ROGAN
*Director of the United States Patent and Trademark Office*